Figure 1:
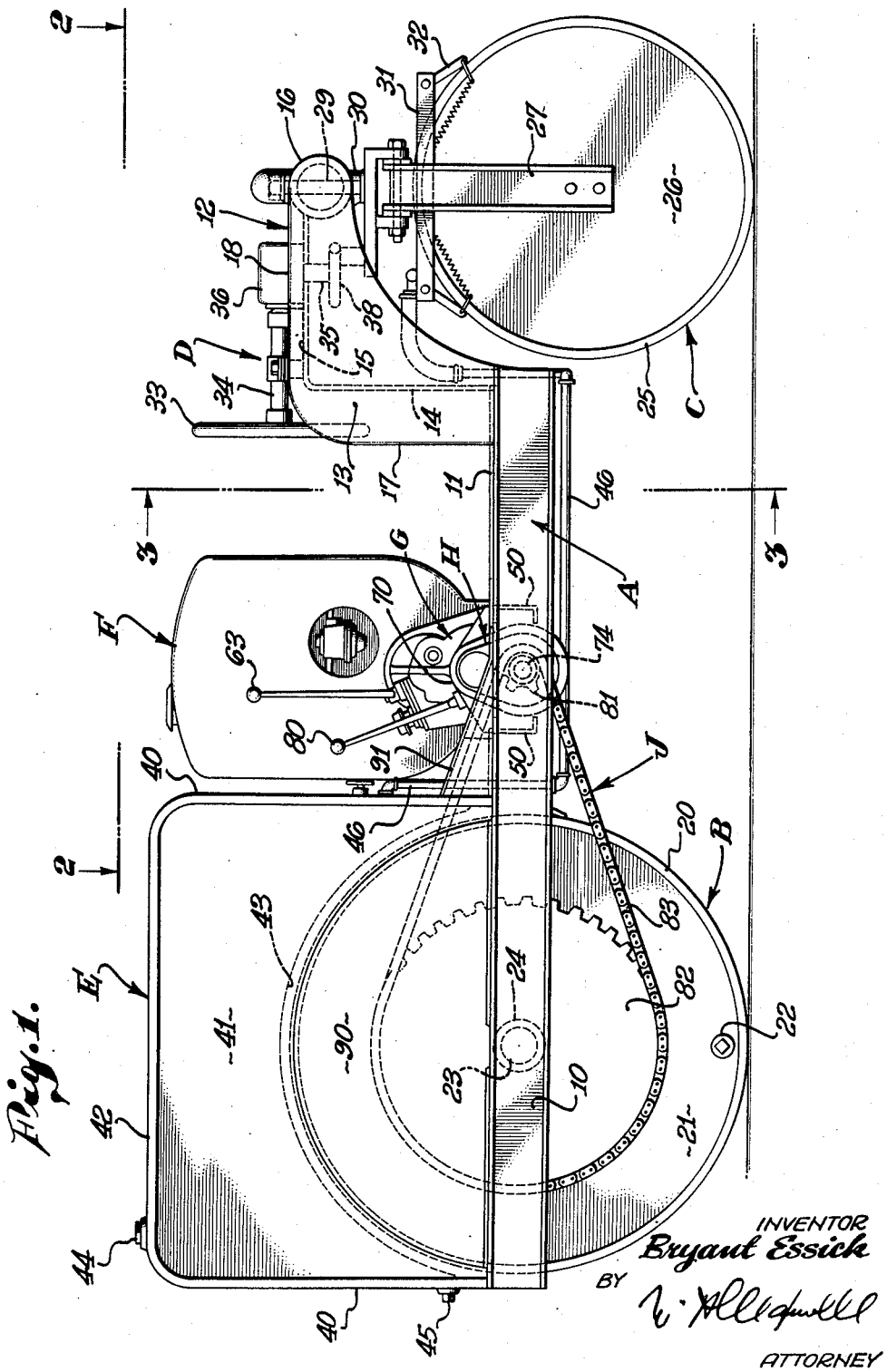

Dec. 19, 1950 B. ESSICK 2,534,507
ROAD ROLLER CONSTRUCTION
Original Filed March 30, 1946 2 Sheets-Sheet 1

INVENTOR
Bryant Essick
BY
ATTORNEY

Dec. 19, 1950   B. ESSICK   2,534,507
ROAD ROLLER CONSTRUCTION
Original Filed March 30, 1946   2 Sheets-Sheet 2
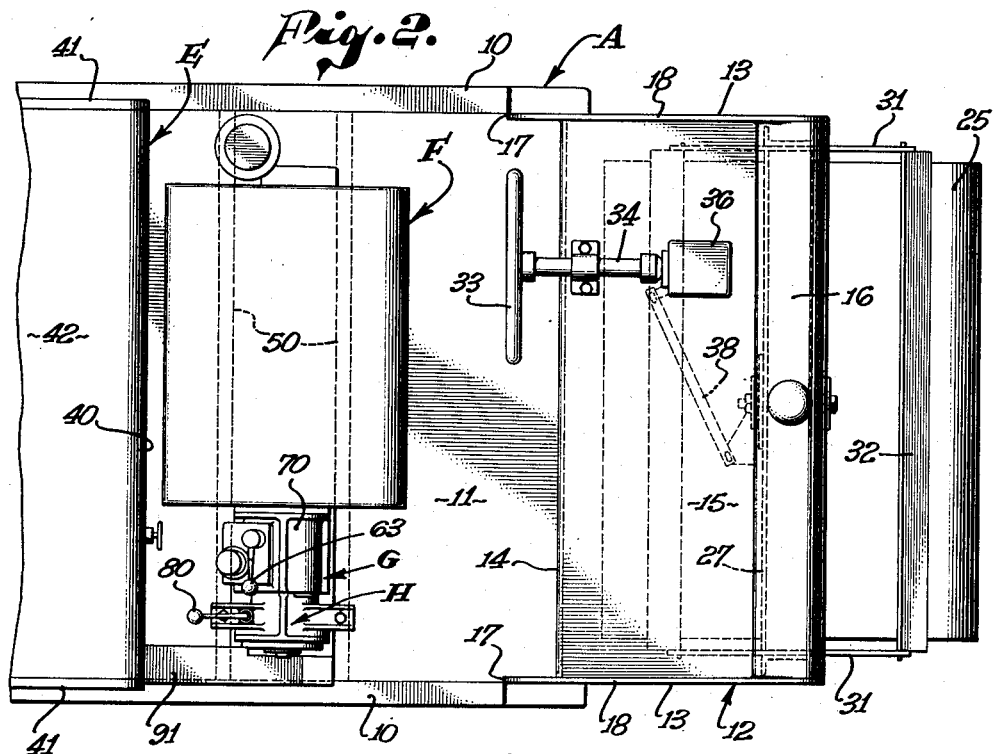
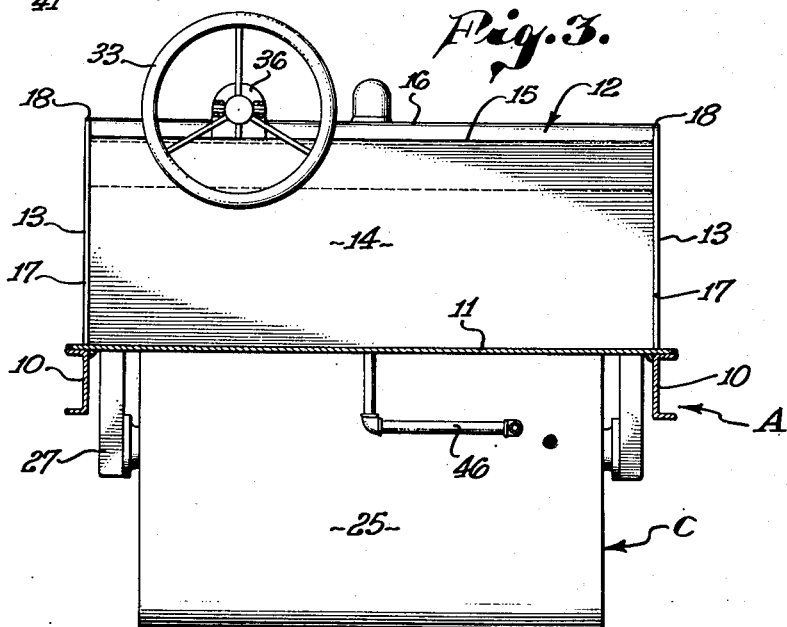
INVENTOR
Bryant Essick
BY
ATTORNEY Patented Dec. 19, 1950

2,534,507

UNITED STATES PATENT OFFICE 2,534,507

ROAD ROLLER CONSTRUCTION

Bryant Essick, Long Beach, Calif., assignor to Essick Manufacturing Company, Los Angeles, Calif., a corporation of California Original application March 30, 1946, Serial No. 658,507. Divided and this application June 23, 1947, Serial No. 756,499

18 Claims. (Cl. 280—106)

This invention has to do with a road roller construction and it is a general object of the present invention to provide a general road roller construction which is simple, practical and convenient to operate.

This application is division of my copending application entitled "Road Roller" filed March 30, 1946, Serial No. 658,507, in which application I specifically claim a road rolling vehicle including its drive.

It is a general object of my present invention to provide a road roller of improved construction wherein the forward portion of the frame is in the nature of a head which not only effectively supports the yoke of the steering roller but also carries the mechanism of the steering gear and forms a convenient advantageously located seat on which the operator can ride. With the arrangement that I have provided the seat formed by the head of the frame is located in a most convenient and advantageous manner relative to the steering wheel and relative to the controls so that the machine as a whole is compact and convenient to manipulate.

The various objects and features of my invention will be fully understood from the following detailed description of a typical preferred form and application of the invention, throughout which description reference is made to the accompanying drawings, in which:

Fig. 1 is a side elevation of the road roller embodying my present invention; Fig. 2 is a plan view of the forward portion of the vehicle; and Fig. 3 is a transverse sectional view taken as indicated by line 3—3 on Fig. 1.

The road roller or vehicle that I have provided involves, generally, a frame A, two rollers that support the frame, one a main drive roller B and the other a steering roller C, a steering gear D for the steering roller C, a storage tank E preferably located in the region of the drive roller B, a prime mover F, a clutch unit G, a transmission or speed change mechanism H, and a direct drive means J from the transmission H to the drive roller B.

The frame A that I have provided is of simple, inexpensive, yet effective construction. It involves, generally, two spaced parallel side rails 10, a platform 11 carried between the side rails at the forward end portion thereof, and a head 12 carried by the forward ends of the side rails. The rails 10 may be simple, straight, horizontally disposed beams and the platform 11 may be a simple, flat plate extending between and anchored to the beams.

The head 12 of the frame forms a mounting for the steering roller C, or at least forms a part of the frame to which the steering roller is attached, and in accordance with my construction it involves, essentially, two spaced side plates 13, one carried by each of the beams 10, which plates extend up and forward from the beams in the manner clearly shown in Fig. 1. The head further includes a plate that extends between the side plates 13 and has a vertical section 14 extending upwardly from the forward end of the platform 11 to a point a substantial distance above the platform and a horizontal section 15 which extends forward from the upper end of the section 14 between the plates 13 to a point where it joins a transverse head beam 16.

The section 14 may be located somewhat forward of the vertical edges 17 of sides 13 and the section 15 may be located somewhat below the top edges 18 of the sides 13. The sections 14 and 15 are preferably secured, for instance, welded, to the sides 13 where they adjoin them and these parts thus form a rigid durable frame construction.

The head beam 16 is preferably a tubular part extending between the forward end portions of the side plates 13 and has its ends joined thereto while the forward edge of the plate section 15 is preferably joined or welded to the beam 16. It is to be observed that the horizontal section 15 of the head construction just described forms a conveniently located and arranged seat or support for a seat cushion, or the like, on which an operator can sit while his feet are on the platform 11.

The main or drive roller B is preferably a large roller and is preferably designed so that it can be weighted with water, or the like. In the construction illustrated the roller includes a cylindrical rim 20 with end plates 21 closing it at the ends so that it is in the form of a large drum. A suitable access opening is provided and is normally closed by a removable plug 22 so that a suitable quantity of water or other heavy material can be arranged in the roller, if desired. The roller B is carried on an axle 23 supported by bearings 24 attached to the beams 10 and the parts are preferably proportioned so that the roller B operates between the beams 10.

The steering roller C may be a simple drum-like structure involving a rim 25 and end plates 26 closing the ends of the cylindrical rim. The roller C is carried by a yoke 27 which is provided with a king or pivot pin 29 that is pivotally connected to the head beam 16 of the frame.

The head beam 16 is preferably provided with a downwardly facing boss 30 against which the yoke seats. The arms of the yoke that carry the roller C depend down at either end of the roller and they may carry a frame 31 supporting scrapers 32 as shown in Fig. 1.

The steering gear D is provided for steering or turning the roller C about the pivot pin 29 and it is preferably carried by the horizontal section 15 of the frame head and somewhat to one side of the center of the vehicle so that it does not obstruct the seating area provided by the section 15. The steering gear that I have shown involves, generally, a hand wheel 33 on the forward end of a horizontally disposed drive shaft 34 which drives a vertical shaft 35 through a suitable gear drive 36. The shaft 34 is located above the plate section 15 and projects somewhat forward thereof so that the wheel 33 is supported a short distance forward of the plate section 14, while the shaft 35 extends down through the plate section 15 and is operatively connected with the yoke 27 through a suitable link mechanism 38 so that when the shaft 35 is rotated the yoke 27 is turned on the pivot pin 29.

The storage tank E is preferably located over the drive roller B and is preferably shaped to nest over the drive roller B. In the case illustrated the tank E involves flat ends 40, vertical flat sides 41, a flat top 42 and a concave bottom 43 which conforms to the curvature of the rim 20 of the roller B. A filling opening is provided in the top of the tank and is normally closed by a plug 44 and a suitable drain opening is provided in the lower part of the tank and is normally closed by a plug 45. The tank just described is supported on the beams 10 so that the load or weight thereof is communicated through the beams to the roller B. Suitable hoses or pipe lines 46 lead from the tank to the rollers B and C so water can be supplied to the rollers as the machine operates.

The prime mover F that I have provided is preferably an engine such as an internal combustion engine and it, together with the clutch means and a change speed transmission, forms a unit that is disposed transversely of the vehicle in the space that occurs between the tank of means E and the section 14 of the head of the frame, it being preferred to locate this unit immediately adjacent the tank so that there is space between the unit and the head of the frame where the operator can conveniently stand, which space is convenient to the steering wheel 33. The unit formed of the parts just described is preferably carried by a pair of supports 50 that extend transversely between the beams 10 to the desired point so that they effectively carry the unit.

I prefer to employ a reversing clutch such as I set forth and claim in my co-pending application, which clutch includes two elements, one engaged to operate the vehicle in one direction and the other engaged to operate the vehicle in the opposite direction.

A shiftable control member 63 controls the clutch of the unit or elements of the clutch above mentioned. The control member is located so that it is convenient to the operator who may stand on the platform and operate the control or sit on the seat and reach the control by bending and reaching forward.

I provide a convenient gear shift lever 80 projecting from the exterior of the housing 70 of the clutch and transmission mechanism, which lever is preferably located near the control member 63 to be convenient to the operator in substantially the same manner as member 63.

The drive means J that I have provided between the power unit above mentioned and the roller B is preferably a simple direct drive which effects a substantial speed reduction between the shaft 74 of the unit and the roller. The shaft 74 has an extension at the exterior of the housing 70 which extension carries a drive sprocket 81. A driven sprocket 82 is carried by the roller B and a chain 83 connects the sprockets 81 and 82. It will be observed from the drawings that the sprocket 82 is very much larger than the sprocket 81 with the result that a substantial speed reduction is effected in the course of the drive from the transmission to the roller.

From the foregoing description it will be apparent that I have provided a vehicle or roller that can be varied in action by varying the material carried within the roller B and further, it will be observed that the principal working parts are confined to the unit formed by the engine, clutch means and transmission, and that this unit is arranged convenient to the operator and transverse of the vehicle. The only exposed drive parts are the chain and sprockets and, in practice, these may be housed by suitable guards 90 and 91, if desired.

The shift levers 63 and 80 are convenient to the operator as is the hand wheel 33 by which the vehicle is steered. The operator can either sit on the horizontal section 15 of the frame as the vehicle is being operated, or he can stand on the platform 11 as he desires. In manipulating the vehicle the transmission is normally set at either one speed or the other by shifting the member 80 to one extreme position or the other. With the transmission thus set it can be left alone and it determines the general speed of the roller except, of course, for control gained through the speed at which the engine is operated. To disengage the drive so that the vehicle is not driven by the engine the member 63 is positioned in a central or neutral position. To drive the roller in one direction or the other the lever 63 is manipulated engaging the desired clutch element. The shift from one clutch element to the other can be made very rapidly, that is, by merely swinging the lever 63 from one extreme position to the other, with the result that the roller will change direction without a hesitation or dwell such as is undesirable.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A frame for a road roller including, spaced longitudinal beams, a platform carried by and between the beams, and a roller carrying head carried by the beams adjacent the platform including side plates extending up from the beams, a transversely disposed head beam carried by and between the plates, and a horizontal stiffening plate between the plates forming a seat and joined to the head beam.

2. A frame for a road roller having a main drive roller and a steering roller including, spaced longitudinal beams receiving the main drive roller between them, a platform carried by and between the beams, and a head carrying the steering roller and projecting vertically from the platform and longitudinally of the beams and including side plates joined to and forming extensions of the beams and a horizontal stiffening plate joined to and extending between the side plates in a plane above that of the platform to act as a seat while the platform acts as a foot rest.

3. A frame for a road roller including, spaced longitudinal beams, a platform carried by and between the beams, and a roller carrying head carried by the beams and projecting from the platform longitudinally of the beams and including, side plates joined to and forming extensions of the beams, a horizontal stiffening plate joined to and extending between the side plates in a plane above that of the platform to act as a seat while the platform acts as a foot rest, and a head beam joined to and extending between the side plates and also joined to the horizontal plate.

4. A frame for a road roller including, spaced longitudinal beams, a platform carried by and extending between the beams, and a roller carrying head projecting up from the platform and longitudinally of the beams and including side plates joined to and forming extensions of the beams and a horizontal stiffening plate joined to and extending between the side plates below the upper edge portions thereof in a plane above that of the platform to act as a seat while the platform acts as a foot rest.

5. A frame for a road roller including, spaced longitudinal beams, a platform carried by and between the beams, and a roller carrying head projecting from the platform longitudinally of the beams and including, side plates joined to and forming extensions of the beams and a horizontal stiffening plate joined to and extending between the side plates in a plane above that of the platform to act as a seat while the platform acts as a foot rest, the horizontal plate being terminated short of the edge portions of the side plates faced toward the beams.

6. A frame for a road roller including, spaced longitudinal beams, a platform carried by and between the beams, and a roller carrying head projecting from the platform longitudinally of the beams and including, side plates joined to and forming extensions of the beams and a horizontal plate rigidly joined to and extending between the side plates below the upper edges thereof in a plane above that of the platform to act as a seat while the platform acts as a foot rest, the horizontal plate being terminated short of the edge portions of the side plates faced toward the beams.

7. A frame for a road roller including, spaced longitudinal beams, a platform carried by and between the beams, and a roller carrying head projecting from the platform longitudinally of the beams and including side plates joined to and forming extensions of the beams and a horizontal plate joined to and extending between the side plates in a plane above that of the platform to act as a seat while the platform acts as a footrest, the horizontal plate being terminated short of the edge portions of the side plates faced toward the beams and having a part joined thereto and extending downwardly therefrom to the platform.

8. A frame for a road roller including, spaced longitudinal beams, a platform carried by and between the beams, and a head carried by and projecting upwardly and longitudinally of the beams and including, side plates, a head beam carried between the projecting portions of the plates, a horizontal plate extending between the side plates in a plane above that of the platform, a roller mounting carried by the head beam, and steering gear for the roller mounting carried by the horizontal plate.

9. A frame for a road roller including, spaced longitudinal beams, a platform carried by and between the beams, and a head carried by and projecting upwardly and longitudinally of the beams and including, side plates, a head beam carried between the projecting portions of the plates, a horizontal plate extending between the side plates in a plane above that of the platform, a roller mounting carried by the head beam, and steering gear for the roller mounting carried by the horizontal plate, the steering gear including a hand wheel at the end of the head remote from the beam accessible to a person with his feet on the platform.

10. A frame for a road roller including, spaced longitudinal beams, a platform carried by and between the beams, and a head carried by and projecting upwardly and longitudinally of the beams and including, side plates, a head beam carried between the projecting portions of the plates, a horizontal plate extending between the side plates in a plane above that of the platform, a roller mounting carried by the head beam, and steering gear for the roller mounting carried by the horizontal plate, the steering gear including operating mechanism beneath the horizontal plate and a hand wheel at the end of the head remote from the beam accessible to a person with his feet on the platform.

11. A frame for a road roller including, spaced longitudinal beams, a platform carried by and between the beams, and a roller carrying head projecting from the platform longitudinally of the beams and including, side plates joined to and forming extensions of the beams, a horizontal plate joined to and extending between the side plates in a plane above that of the platform to act as a seat while the platform acts as a foot rest, and a tubular head beam joined to and extending between the side plates and also joined to the horizontal plate.

12. A frame for a road roller including, spaced longitudinal beams, a platform carried by and between the beams, and a head carried by and projecting upwardly and longitudinally of the beams and including, side plates, a head beam carried between the projecting portions of the plates, and a horizontal plate extending between the side plates in a plane above that of the platform, a roller mounting carried by the head beam beneath the head beam on a vertical pivotal axis, and steering gear for the roller mounting carried by the horizontal plate.

13. A frame for a road roller including, spaced longitudinal beams, a power unit support carried by the beams, a platform carried by the beams adjacent the support, and a head carried by the beams spaced from the support and extending upward and longitudinally of the beams, the head including, side plates joined to the beams, a head beam extending between the side plates, and a horizontal plate extending between the side plates in a plane above the platform, a roller support carried by the head beam, and steering gear for the roller support including a hand wheel accessible to an operator with his feet on the platform.

14. A frame for a road roller including, spaced longitudinal beams, a power unit support carried by the beams, a platform carried by the beams adjacent the support, and a head carried by the beams spaced from the support and extending upward and longitudinally of the beams, the head including, side plates joined to the beams, a head beam extending between the side plates, and a horizontal plate extending between the side plates in a plane above the platform, a roller support carried by the head beam, and steering gear for the roller support including a hand wheel accessible to an operator with his feet on the platform, the horizontal plate being below the upper edge portions of the side plates.

15. A frame for a road roller including, spaced longitudinal beams, a power unit support carried by the beams, a platform carried by the beams adjacent the support, and a head carried by the beams spaced from the support and extending upward and longitudinally of the beams, the head including, side plates joined to the beams, a head beam extending between the side plates, a horizontal plate extending between the side plates in a plane above the platform, and a vertical plate extending between the side plates and between the edge portion of the horizontal plate which is toward the support to the platform, a roller support carried by the head beam, and steering gear for the roller support including a hand wheel accessible to an operator with his feet on the platform.

16. A frame for a road roller including, spaced longitudinal beams, a power unit support carried by the beams, a platform carried by the beams adjacent the support, and a head carried by the beams spaced from the support and extending upward and longitudinally of the beams, the head including, side plates joined to the beams, a head beam extending between the side plates, a horizontal plate extending between the side plates in a plane above the platform, and a vertical plate extending between the side plates and between the edge portion of the horizontal plate which is toward the support to the platform, a roller support carried by the head beam, and steering gear for the roller support including, a hand wheel accessible to an operator with his feet on the platform, the vertical plate being substantially removed from the edges of the side plates which are toward the support.

17. A frame for a road roller having a main drive roller and a steering roller including, spaced longitudinal beams receiving the main drive roller between them, a platform carried by and between the beams, and a head adjacent the platform and carrying the steering roller including, flat vertical side plates parallel with and extending up from the beams and from the platform and a horizontal plate fixed to and extending between the side plates forming a seat for use simultaneously with the platform.

18. A frame for a road roller having a main drive roller and a steering roller including, spaced longitudinal beams receiving the main drive roller between them, a platform carried by and between the beams, and a head adjacent the platform and carrying the steering roller including, flat vertical side plates parallel with and extending up and forward from the beams, a vertical stiffening plate section extending up from the beams and between the plates and attached thereto, and a horizontal stiffening plate section extending forward from the upper edge of the vertical section, the said horizontal section being located between and fixed to the side plates forming a seat.

BRYANT ESSICK.

REFERENCES CITED

The following references are of record in the file of this patent:

UNITED STATES PATENTS

| Number | Name | Date |
| --- | --- | --- |
| 714,762 | Townsend | Dec. 2, 1902 |
| 903,223 | Neyerlin | Nov. 10, 1908 |
| 1,141,295 | Wright | June 1, 1915 |
| 1,446,409 | Aitken | Feb. 20, 1923 |
| 1,546,119 | Davis | July 14, 1925 |
| 2,078,900 | Biles | Apr. 27, 1937 |
| 2,120,745 | Greiner et al. | June 14, 1938 |
| 2,359,519 | Greiner | Oct. 3, 1944 |